(12) United States Patent
Bohling et al.

(10) Patent No.: US 9,447,215 B2
(45) Date of Patent: Sep. 20, 2016

(54) MULTISTAGE EMULSION POLYMER AND IMPROVED PIGMENT EFFICIENCY

(75) Inventors: James Charles Bohling, Lansdale, PA (US); Steven James Broadwater, Warminster, PA (US); Arnold Stan Brownell, Lansdale, PA (US); John William Hook, III, Warminster, PA (US); Reginald T. Smart, Horsham, PA (US)

(73) Assignee: Rohm and Haas Company, Philadelphia, PA (US)

( * ) Notice: Subject to any disclaimer, the term of this patent is extended or adjusted under 35 U.S.C. 154(b) by 604 days.

(21) Appl. No.: 13/218,926

(22) Filed: Aug. 26, 2011

(65) Prior Publication Data

US 2012/0058277 A1 Mar. 8, 2012

Related U.S. Application Data

(60) Provisional application No. 61/402,771, filed on Sep. 3, 2010.

(51) Int. Cl.
| | |
|---|---|
| *C08F 30/02* | (2006.01) |
| *C08F 220/18* | (2006.01) |
| *C08F 297/02* | (2006.01) |
| *C08F 297/04* | (2006.01) |
| *C08F 2/00* | (2006.01) |
| *C08F 2/22* | (2006.01) |
| *C08F 265/06* | (2006.01) |
| *C09C 1/00* | (2006.01) |
| *C09D 7/12* | (2006.01) |
| *C08F 220/06* | (2006.01) |
| *C08F 220/36* | (2006.01) |
| *C08F 230/02* | (2006.01) |

(52) U.S. Cl.
CPC ............ *C08F 220/18* (2013.01); *C08F 2/001* (2013.01); *C08F 2/22* (2013.01); *C08F 265/06* (2013.01); *C08F 297/02* (2013.01); *C08F 297/026* (2013.01); *C08F 297/04* (2013.01); *C09C 1/0084* (2013.01); *C09D 7/1225* (2013.01); *C08F 220/06* (2013.01); *C08F 220/36* (2013.01); *C08F 230/02* (2013.01)

(58) Field of Classification Search
CPC ........ C08F 2/001; C08F 2/22; C08F 220/06; C08F 230/02; C08F 297/02; C08F 297/026; C08F 297/04

USPC .................................................. 526/87, 274
See application file for complete search history.

(56) References Cited

U.S. PATENT DOCUMENTS

| | | | |
|---|---|---|---|
| 6,080,802 A | 6/2000 | Emmons et al. | |
| 6,492,451 B1 | 12/2002 | Dersch et al. | |
| 6,545,084 B2 | 4/2003 | Brown et al. | |
| 6,576,051 B2* | 6/2003 | Bardman et al. | 106/436 |
| 7,179,531 B2* | 2/2007 | Brown et al. | 428/407 |
| 7,285,590 B2* | 10/2007 | Holub et al. | 524/460 |
| 2003/0018103 A1 | 1/2003 | Bardman et al. | |
| 2005/0107527 A1 | 5/2005 | Holub et al. | |
| 2005/0203211 A1 | 9/2005 | Gebhard | |
| 2005/0222299 A1 | 10/2005 | Garzon et al. | |
| 2007/0208129 A1 | 9/2007 | Finegan et al. | |
| 2008/0075868 A1* | 3/2008 | Dombrowski | 427/385.5 |
| 2008/0146724 A1 | 6/2008 | Bohling et al. | |
| 2008/0269402 A1 | 10/2008 | Maurice et al. | |

FOREIGN PATENT DOCUMENTS

| | | |
|---|---|---|
| CN | 101298487 A | 11/2008 |
| EP | 193298 A2 | 9/1986 |
| EP | 433797 A2 | 6/1991 |
| EP | 1398333 A1 | 3/2004 |
| EP | 1496091 A1 * | 1/2005 |
| EP | 1988105 A1 | 11/2008 |
| EP | 2077301 A2 | 7/2009 |
| WO | 2005049184 A2 | 6/2005 |
| WO | 2005097853 A1 | 10/2005 |

\* cited by examiner

*Primary Examiner* — Ling Choi
*Assistant Examiner* — David L Miller
(74) *Attorney, Agent, or Firm* — Karl E. Stauss; Ronald D. Bakule

(57) ABSTRACT

This invention provides a multistage emulsion polymer including, as copolymerized units: from 0.5% to 5%, by weight P-acid monomer, based on the weight of the emulsion polymer; from 0% to 0.05% by weight multiethylenically unsaturated monomer, based on the weight of the emulsion polymer; and at least one second monoethylenically unsaturated monomer; the emulsion polymer having a calculated Tg of from −20° C. to 50° C.; the emulsion polymer is formed by the "pulsed" addition of 75% to 100% of the P-acid monomer during a stage including from 10% to 50% of the total monomer weight, preferably added during the relatively early stages of the polymerization. A multistage polymer/TiO2 composite particle and an aqueous coating composition including the composite particle are also provided.

7 Claims, No Drawings

MULTISTAGE EMULSION POLYMER AND IMPROVED PIGMENT EFFICIENCY

This invention relates to a multistage emulsion polymer including, as copolymerized units: from 0.5% to 5%, by weight P-acid monomer, based on the weight of the emulsion polymer; from 0% to 0.05% by weight multiethylenically unsaturated monomer, based on the weight of the emulsion polymer; and at least one second monoethylenically unsaturated monomer; the emulsion polymer having a calculated Tg of from −20° C. to 50° C.; wherein the emulsion polymer is formed by emulsion copolymerization of the at least one second monoethylenically unsaturated monomer wherein 75% to 100% of the P-acid monomer is added concurrently with the second monoethylenically unsaturated monomer during a stage including from 10% to 50% of the total monomer weight. A composite particle including a TiO2 particle and a plurality of polymer particles of the multistage emulsion polymer adsorbed on the surface of the TiO2 particle, an aqueous coating composition including the composite particle, and a method for providing a coating are also provided.

Titanium dioxide (TiO2) is an expensive component of many paints. The efficacy of the TiO2 as a hiding pigment is reduced when TiO2 particles are allowed to come too close together upon film formation and drying (which they tend to do). It has been disclosed that the spacing of TiO2 and its resultant efficiency can be improved by employing an adsorbing emulsion polymer. Prior efforts employed hard and/or cross-linked adsorbing emulsion polymers which are not desirable in paints, particularly for low or zero VOC paints. Hardness or cross-linking was employed because one would expect these features to achieve spacing from an adsorbed emulsion polymer that would not collapse upon film formation.

U.S. Pat. No. 7,179,531 discloses polymer particles having select functional or absorbing groups useful for preparing organic-inorganic composite particles that are suitable for providing dried coatings with improved hiding. Surprisingly, we found that we could achieve significant improvements in TiO2 hiding efficacy with a relatively low Tg, substantially uncross-linked emulsion polymer. The relatively low Tg is important to obtain proper low temperature film formation with little or no coalescent and the substantial absence of cross-linking improves the scrub resistance of the dry coating.

In a first aspect of the present invention, there is provided a multistage emulsion polymer comprising, as copolymerized units: from 0.5% to 5%, by weight P-acid monomer, based on the weight of said emulsion polymer; from 0% to 0.05% by weight multiethylenically unsaturated monomer, based on the weight of said emulsion polymer; and at least one second monoethylenically unsaturated monomer; said emulsion polymer having a calculated Tg of from −20° C. to 50° C.; wherein said emulsion polymer is formed by emulsion copolymerization of said at least one second monoethylenically unsaturated monomer wherein 75% to 100% of said P-acid monomer is added concurrently with said second monoethylenically unsaturated monomer during a stage comprising from 10% to 50% of the total monomer weight.

In a second aspect of the present invention there is provided a method for forming a multistage emulsion polymer comprising, as copolymerized units: from 0.5% to 5%, by weight P-acid monomer, based on the weight of said emulsion polymer; from 0% to 0.05% by weight multiethylenically unsaturated monomer, based on the weight of said emulsion polymer; and at least one second monoethylenically unsaturated monomer; said emulsion polymer having a calculated Tg of from −20° C. to 50° C.; comprising: (a) emulsion copolymerizing said at least one second monoethylenically unsaturated monomer; and (b) adding 75% to 100%, by weight, of said P-acid monomer concurrently with said second monoethylenically unsaturated monomer during a stage comprising from 10% to 50% of the total monomer weight.

In a third aspect of the present invention, there is provided a composite particle comprising: a) a TiO2 particle; and b) a plurality of polymer particles of the multistage emulsion polymer of the first aspect of the present invention adsorbed on the surface of said TiO2 particle.

In a fourth aspect of the present invention there is provided an aqueous coating composition comprising the composite particle of the third aspect of the present invention.

In a fifth aspect of the present invention there is provided a method for providing a coating comprising: (a) forming the aqueous coating composition of the fourth aspect of the present invention; (b) applying said aqueous coating composition to a substrate; and (c) drying, or allowing to dry, said applied aqueous coating composition.

The multistage emulsion polymer of the present invention relates to a polymer formed by emulsion polymerization in an aqueous medium, the "aqueous medium" herein including water and from 0% to 30%, by wt. based on the weight of the medium, of water-miscible compound(s). The multistage emulsion polymer of the present invention includes, as copolymerized units, from 0.5 to 5%, preferably from 1 to 4%, and more preferably from 1% to 2.25%, P-acid monomer, based on the weight of the emulsion polymer; from 0% to 0.05%, preferably 0%, by weight, multiethylenically unsaturated monomer, based on the weight of the emulsion polymer; and at least one second monoethylenically unsaturated monomer.

By "P-acid monomer" herein is meant a phosphorus-containing acid monomer, the monomer containing at least one ethylenic unsaturation and a phosphorus acid group. The P-acid monomer may be in the acid form or as a salt of the phosphorus acid groups. Examples of phosphorus acid monomers include:

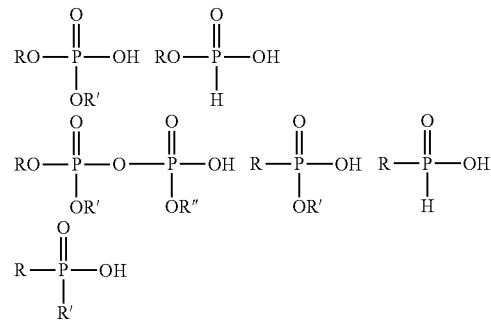

wherein R is an organic group containing an acryloxy, methacryloxy, styryl, aryl, or a vinyl group; and R' and R" are independently selected from H and a second organic group. The second organic group may be saturated or unsaturated.

Suitable phosphorus acid monomers include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxy-methyl) fumarate or itaconate, derivatives of (meth)acrylic acid esters, such as, for examples phosphates of hydroxyalkyl(meth) acrylates including 2-hydroxyethyl (meth)acrylate, 3-hydroxypropyl (meth)acrylates, and the like. Other suitable phosphorous acid monomers include CH2=C(R)—C(O)—O—(R1O)n-P(O)(OH)2, where R=H or CH3 and R1=alkyl, such as SIPOMER™ PAM-100, SIPOMER™ PAM-200, SIPOMER™ PAM-300, and SIPOMER™ PAM-4000, available from Rhodia, Inc. Other suitable phosphorus acid monomers are phosphonate functional monomers, disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid. Further suitable phosphorus functional monomers are Harcross T-Mulz 1228 and 1,2-ethylenically unsaturated (hydroxy)phosphinylalkyl (meth)acrylate monomers, disclosed in U.S. Pat. No. 4,733,005, and include (hydroxy)phosphinylmethyl methacrylate. Preferred phosphorus acid monomers are dihydrogen phosphate monomers, which include 2-phosphoethyl (meth)acrylate, 2-phosphopropyl (meth)acrylate, 3-phosphopropyl (meth)acrylate, and 3-phospho-2-hydroxypropyl (meth) acrylate. Preferred are 2-phosphoethyl (meth)acrylate, 2-phosphopropyl (meth)acrylate, 3-phosphopropyl (meth) acrylate, 3-phospho-2-hydroxypropyl (meth)acrylate, SIPOMER™ PAM-100, and SIPOMER™ PAM-200.

Multiethylenically unsaturated monomers include, for example, allyl (meth)acrylate, diallyl phthalate, butadiene, 1,4-butylene glycol di(meth)acrylate, 1,2-ethylene glycol di(meth)acrylate, 1,6-hexanediol di(meth)acrylate, and divinyl benzene. Multiethylenically unsaturated monomers herein expressly exclude P-containing multiethylenically unsaturated monomers such as multiethylenically unsaturated PEM diesters, and the like.

The at least one copolymerized second monoethylenically unsaturated monomer excludes acid group containing monomers such as, for example, P-acid monomers and second acid-containing monomers, or salts thereof, aldehyde-reactive group-containing monomers, and multiethylenically unsaturated monomers and includes, for example, (meth) acrylic ester monomers including methyl (meth)acrylate, ethyl (meth)acrylate, butyl (meth)acrylate, 2-ethylhexyl (meth)acrylate, decyl (meth)acrylate, hydroxyethyl (meth) acrylate, hydroxypropyl (meth)acrylate, ureido-functional (meth)acrylates and acetoacetates, acetamides or cyanoacetates of (meth)acrylic acid; styrene or substituted styrenes; vinyl toluene; vinyl acetate or other vinyl esters; vinyl monomers such as vinyl chloride, vinylidene chloride, N-vinyl pyrollidone; (meth)acrylonitrile; and N-alkylol (meth) acrylamide. The use of the term "(meth)" followed by another term such as (meth)acrylate or (meth)acrylamide, as used throughout the disclosure, refers to both acrylates or acrylamides and methacrylates and methacrylamides, respectively.

In certain embodiments of the invention the multistage emulsion polymer includes, as copolymerized units, from 0.01% to 0.6%, preferably from 0.1% to 0.5%, by weight, based on the weight of the emulsion polymer, second acid-containing monomer, or salts thereof. The second acid-containing monomer excludes P-acid monomers and salts thereof, but includes both S-acid monomers and carboxylic acid monomers, and salts thereof. Second acid-containing monomers include (meth)acrylic acid, crotonic acid, itaconic acid, fumaric acid, maleic acid, and mono-ester derivatives of diacids, such as monomethyl itaconate, monomethyl fumarate, and monobutyl fumarate. Also included is maleic anhydride that is able to function similarly. Examples of monomers containing sulfur acid groups include 2-acrylamido-2-methyl-1-propanesulfonic acid, sulfoethyl (meth)acrylate, and vinyl sulfonic acid and sodium styrene sulfonate. Preferred second acid-functional monomers are (meth)acrylic acid, sodium styrene sulfonate, itaconic acid; and salts thereof. Most preferred second acid-functional monomers are methacrylic acid, sodium styrene sulfonate, and salts thereof.

In certain embodiments of the invention the multistage emulsion polymer includes as copolymerized units from 0.01% to 3%, preferably from 0.1% to 2%, by weight based on the weight of the multistage emulsion polymer, aldehyde-reactive group-containing monomer. By "aldehyde reactive group-containing monomer" is meant herein a monomer which, in a homogeneous solution containing 20% by weight of the monomer and an equimolar amount of formaldehyde at any pH from 1 to 14, will exhibit greater than 10% extent of reaction between the monomer and formaldehyde on a molar basis in one day at 25° C. Included as ethylenically unsaturated aldehyde reactive group-containing monomers are, for example, vinyl acetoacetate, acetoacetoxyethyl (meth)acrylate, acetoacetoxypropyl (meth)acrylate, allyl acetoacetate, acetoacetoxybutyl (meth)acrylate, 2,3-di(acetoacetoxy)propyl (meth)acrylate, vinyl acetoacetamide, acetoacetoxyethyl (meth) acrylamide, 3-(2-vinyloxyethylamino)-propionamide, N-(2-(meth) acryloxyethyl)-morpholinone-2,2-methyl-1-vinyl-2-imidazoline, 2-phenyl-1-vinyl-2-imidazoline, 2-(3-oxazolidinyl)ethyl (meth) acrylate, N-(2-vinoxyethyl)-2-methyloxazolidine, 4,4-dimethyl-2-isopropenyloxazoline, 3-(4-pyridyl)propyl (meth)acrylate, dimethylaminoethyl (meth)acrylate, 2-methyl-5-vinyl-pyridine, 2-vinoxyethylamine, 2-vinoxyethylethylene-diamine, 3-aminopropyl vinyl ether, 2-amino-2-methylpropyl vinyl ether, 2-aminobutyl vinyl ether, tert-butylaminoethyl (meth)acrylate, 2-(meth)acryloxyethyldimethyl-β-propiobetaine, diethanolamine monovinyl ether, o-aniline vinyl thioether, (meth)acryloxyacetamido-ethylethyleneurea, ethyleneureidoethyl (meth) acrylate, (meth)acrylamidoethyl-ethyleneurea, (meth)acrylamidoethyl-ethylenethiourea, N-((meth)acrylamidoethyl)-N-(1-hydroxymethyl)ethyleneurea, N-((meth) acrylamidoethyl)-N-(1-methoxy)methylethyleneurea, N-formamidoethyl-N-(1-vinyl)ethyleneurea, N-vinyl-N-(1-aminoethyl)-ethyleneurea, N-(ethyleneureidoethyl)-4-pentenamide, N-(ethylenethioureidoethyl)-10-undecenamide, butyl ethyleneureido-ethyl fumarate, methyl ethyleneureido-ethyl fumarate, benzyl N-(ethyleneureido-ethyl)fumarate, benzyl N-(ethyleneureido-ethyl)maleamate, N-vinoxyethyl-ethylene-urea, N-(ethyleneureidoethyl)-crotonamide, ureidopentyl vinyl ether, 2-ureidoethyl (meth)acrylate, N-2-(allylcarbamoto)aminoethyl imidazolidinone, 1-(2-((2-hydroxy-3-(2-propenyloxy)propyl)amino)ethyl)-2-imidazolidinone, hydrogen ethyleneureidoethyl itaconamide, ethyleneureidoethyl hydrogen itaconate, bis-ethyleneureidoethyl itaconate, ethyleneureidoethyl undecylenate, ethyleneureidoethyl undecylenamide, 2-(3-methylolimidazolidone-2-yl-1) ethyl acrylate, N-acryloxyalkyl oxazolidines, acylamidoalkyl vinyl alkyleneureas, aldehyde-reactive amino group-containing monomers as dimethyaminoethyl methacrylate, and ethylenically unsaturated monomers containing aziridene functionality. Preferred is 0.25% to 2%, by weight based multistage emulsion polymer weight, of a copolymerized ureido methacrylate. Preferred a process wherein aldehyde reactive group-containing monomer is copolymerized in the same stage as P-acid monomer.

The calculated glass transition temperature ("Tg") of the multistage emulsion polymer is from −20° C. to 50° C., preferably from −10° C. to 35° C., and more preferably from −10° C. to 20° C. The Tg of the multistage emulsion polymer is calculated from the overall composition of the multistage emulsion polymer regardless of the number or compositions of the individual stages. Tgs of the polymers are calculated herein by using the Fox equation (T. G. Fox, Bull. Am. Physics Soc., Volume 1, Issue No. 3, page 123 (1956)), that is, for calculating the Tg of a copolymer of monomers M1 and M2, $$1/Tg(calc.) = w(M1)/Tg(M1) + w(M2)/Tg(M2),$$

wherein
Tg(calc.) is the glass transition temperature calculated for the copolymer
w(M1) is the weight fraction of monomer M1 in the copolymer
w(M2) is the weight fraction of monomer M2 in the copolymer
Tg(M1) is the glass transition temperature of the homopolymer of M1
Tg(M2) is the glass transition temperature of the homopolymer of M2,
all temperatures being in ° K.

The glass transition temperature of homopolymers may be found, for example, in "Polymer Handbook", edited by J. Brandrup and E. H. Immergut, Interscience Publishers.

The emulsion polymerization techniques typically used in the method for forming the multistage emulsion polymer of the present invention are well known in the art such as, for example, as disclosed in U.S. Pat. Nos. 4,325,856; 4,654, 397; and 4,814,373. Conventional surfactants, and mixtures thereof, may be used such as, for example, anionic and/or nonionic emulsifiers such as, for example, alkali metal or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators, also referred to as catalysts, may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant, also referred to as an activator, such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Chain transfer agents such as mercaptans may be used to lower the molecular weight of the polymers. Any of the ingredients such as, for example, surfactants, initiators, and reductants disclosed above may be the same or different in composition or amount in the different stages of the multistage emulsion polymerization.

The monomers may be added individually or in monomer mixtures; they may be added neat or as an emulsion in water. The monomer herein is added in two or more stages. The second monoethylenically unsaturated monomer is added throughout the reaction. During a portion of the reaction, or stage, which corresponds to the addition of from 10% to 50%, preferably from 10% to 40%, and more preferably from 10% to 35%, by weight of the total monomer addition, 75% to 100%, preferably from 90% to 100%, and more preferably 100%, by weight of the P-acid monomer is added concurrently with the second monoethylenically unsaturated monomer. This use of a stage relatively rich in P-acid monomer is sometimes described as a "pulsed" addition of the P-acid monomer. In certain embodiments of invention the pulse, or P-acid monomer-rich stage is begun at a point wherein from 0% to 65%, preferably from 0% to 40%, and more preferably from 0% to 30%, by weight of the total added monomer has already been added. That is, it is preferable that the P-acid monomer pulse occurs relatively early in the reaction to form the multistage emulsion polymer.

In certain embodiments of the multistage emulsion polymer the added monomer composition, except for the P-acid monomer, may be constant or substantially constant throughout the reaction. In other embodiments the composition of the monomer added, except for the P-acid monomer, may vary from stage to stage or, independently, may vary within one or more stages (also known as a gradient feed polymerization). It is also contemplated that limited amounts of a relatively high Tg stage such as, for example, less than 10% by weight of a stage having a calculated Tg of from 60° C. to 110° C. may be incorporated in the multistage emulsion polymer.

In a preferred embodiment of the present invention, the multistage emulsion polymer can be produced by a process in which the second acid-containing monomer and the P-acid monomer are co-fed to the polymerization. In this process, it is preferred that there is a concentration of the P-acid monomer and a concentration of the second acid-containing monomer in the reactor available for polymerization simultaneously. The generation of simultaneous significant concentrations is best achieved by an overlap in the feed of the monomers. Because the rate of polymerization is typically quite rapid, the preferred condition is full overlap of P-acid pulse with portions or all of the second acid-containing monomer, this can be accomplished by the addition of both components to the same monomer emulsion to be fed. It is further contemplated that the overlap of the feeds can be less than 100%. A suitable process for executing this includes, but is not limited to, forming a monomer emulsion including both monomers, and gradually feeding this monomer emulsion to the batch reaction.

In certain embodiments of this invention a process for forming the multistage emulsion polymer that minimizes the formation of water-soluble polymer having phosphorus acid groups is desirable. In this process, the multistage emulsion polymer is prepared by an aqueous emulsion polymerization process at low pH. Although not wishing to be bound by a particular theory, it is believed that in an aqueous reaction medium at sufficiently low pH, the P-acid monomer is protonated and is less water-soluble than at higher pH, thereby leading to increased incorporation of the P-acid monomer into the growing polymer particles with a concomitant reduction in the formation of the water soluble polymer having phosphorus acid groups. As used herein, low pH includes pH values in the range of from −1 to less than 2.5, preferably from about 0 to less than 2.2, and more preferably from 1 to 2.1. The pH of the aqueous reaction medium is preferably the native pH of un-buffered P-acid monomer. Alternately, the pH may be adjusted to a low pH by the addition of strong acids, such as sulfuric acid; sulfurous acid; alkyl sulfonic acids; sulfamic acid; hydrochloric acid; iodic acid; periodic acid; selenic acid; chromic acid; nitric acid; pyrophosphoric acid; trifluoroacetic acid; maleic acid; oxalic acid; and the like. The strong acid may added to the aqueous reaction medium prior to, during, or both, the polymerization of the P-acid monomer. In these embodiments the pH of the reaction mixture in a stage(s) other than that in which the P-acid monomer in being polymerized may be different; typically it is preferred that in other stages the pH is higher than 3.5, preferably higher than 5. The pH of the aqueous reaction medium is determined at 20° C. and may be conducted on an aliquot of the aqueous reaction medium that has been removed from the reaction using a pH meter equipped with silver chloride electrodes.

Additional ingredients such as, for example, free radical initiators, oxidants, reducing agents, chain transfer agents, neutralizers, surfactants, and dispersants may be added prior to, during, or subsequent to any of the stages. Processes yielding polymodal particle size distributions such as those disclosed in U.S. Pat. Nos. 4,384,056 and 4,539,361, for example, may be employed.

The average particle diameter of the aqueous polymeric dispersion particles is typically from 30 nm to 500 nm, preferably from 50 nm to 200 nm, and more preferably from 50 nm to 150 nm as measured by a Brookhaven Model BI-90 Particle Sizer supplied by Brookhaven Instrument Corp., Holtsville, N.Y.

One aspect of the present invention is directed to a composite particle including a central TiO2 particle having a plurality of the multistage emulsion polymer particles of the present invention adsorbed on the surface of the TiO2 particle. By "TiO2 particle" herein is meant a particle composed predominantly of TiO2, including rutile TiO2 and anatase TiO2. The TiO2 may have a uniform composition or a heterogeneous composition with two or more phases. Typically, TiO2 can have at least one coating of one or more of silica, alumina, zinc oxide, and zirconia. We have found that specific types of TiO2 require different levels of copolymerized adsorbing P-acid monomer in the multistage emulsion polymer. For example, we have found that a TiO2 grade with a relatively high ratio of Al:Si requires much less adsorbing monomer (1.2 wt %) than a grade with a lower Al:Si ratio which requires 2.3 wt %.

The formation of the composite particle of the present invention is carried out by contacting dispersed TiO2 with the multistage emulsion polymer, typically using conventional low shear mixers. The formation is benefited by a balance of reactivity between the TiO2 and latex; if the reaction is too rapid then coating make-ability will suffer and undesired grit will be formed. Alternately, if the reaction is too weak either no adsorption will take place or it will be slow, resulting in drifting viscosity and tint strength.

In one embodiment of the present invention, there are provided certain aqueous coating compositions including the composite particles of the present invention. The amount of inorganic particles included in the aqueous coating composition is from 0 to 95 volume %, based on the total dry volume of the aqueous composition and inorganic particles. Typically, the aqueous coating composition of this invention, when used to prepare dried coatings, has a solids level in the range of from 20 to 50 volume %, based on the volume of the aqueous composition. The pH of the aqueous composition is typically in the range of from 3 to 11, and preferably, in the range of from 7 to 10. A suitable viscosity range for the aqueous composition is from 50 to 130 Kreb units (KU), preferably from 70 to 120 KU, and more preferably from 90 to 110 KU.

Inorganic particles that may be used in addition to the composite particles include: metal oxides such as zinc oxide, cerium oxide, tin oxide, antimony oxide, zirconium oxide, chromium oxide, iron oxide, lead oxide, aluminum oxide, silicon oxide, titanium dioxide; zinc sulfide, lithopone, calcium carbonate, calcium sulfate, barium sulfate, mica, clay, calcined clay, feldspar, nepheline syenite, wollastonite, diatomaceous earth, alumina silicates, and talc. In one embodiment, the inorganic particles may have a particle size which is from 1 to 100 nm, preferably from 1 to 50 nm. Examples of desired inorganic particles with a particle size of less than 100 nm include zinc oxide, silicon oxide, titanium dioxide, and iron oxide.

The aqueous coating composition may optionally contain organic pigment particles. Suitable organic pigments also include plastic pigments such as solid bead pigments such as, for example, polystyrene and polyvinyl chloride beads and microsphere pigments containing voids or vesicles. Examples of microsphere pigments, which include polymer particles containing one or more voids include Ropaque™ opaque polymer and vesiculated polymer particles.

The aqueous coating compositions including optional inorganic particles are prepared by techniques which are well known in the coatings art. First, the inorganic particles are typically well dispersed in an aqueous medium under high shear such as is afforded by a COWLES® mixer. In one embodiment the composite particles of the present invention are added under low shear stirring along with other coatings adjuvants as desired. Alternatively, the composite particles may be formed in situ during the formation of the aqueous coating composition. The aqueous composition may include, in addition to composite particles, additional multistage emulsion polymer not associated with the composite particles; also film-forming or non-film-forming solution or other emulsion polymers in an amount of 0% to 200% by weight of the multistage emulsion polymer of the present invention, and conventional coatings adjuvants such as, for example, emulsifiers, coalescing agents (coalescents), plasticizers, antifreezes, curing agents, buffers, neutralizers, thickeners, photosensitive moieties, rheology modifiers, humectants, wetting agents, biocides, plasticizers, antifoaming agents, UV absorbers, fluorescent brighteners, light or heat stabilizers, biocides, chelating agents, dispersants, colorants, waxes, water-repellants, and anti-oxidants.

The aqueous coating composition optionally contains a volatile organic compound ("VOC"). A VOC is defined herein as a carbon containing compound that has a boiling point below 280° C. at atmospheric pressure. Water and ammonia are excluded from VOCs. Frequently a VOC is deliberately added to a paint or coating to improve the film properties of a coating or to aid in the application properties of the composition employed to prepare the coating. Examples are glycol ethers, organic esters, aromatic compounds, ethylene and propylene glycol, and aliphatic hydrocarbons.

In certain embodiments, the aqueous coating compositions can contain up to 20% VOC, preferably less than 5% VOC, more preferably less than 3% VOC, and even more preferably less than 1.7% VOC, by weight based on the total weight of the aqueous coating composition.

Typical methods of aqueous coating preparation introduce adventitious VOCs from the preparation of the aqueous composition, biocides, defoamers, soaps, dispersants, and thickeners. These typically account for 0.2% VOC by weight based on the total weight of the aqueous coating composition. Additional methods such as steam stripping and choice of low VOC containing additives like biocides, defoamers, soaps, dispersants, and thickeners are suitable for further reducing the aqueous coating composition to less than 0.05% VOC by weight based on the total weight of the aqueous coating composition. In one embodiment, the aqueous coating composition has less than 0.1% VOC by weight based on the total weight of the aqueous coating composition.

Additionally, the aqueous coating composition can contain coalescing agents that are not VOCs. A coalescing agent is a compound that is added to a water-borne emulsion polymer, paint, or coating, which reduces the minimum film forming temperature (MFFT) of the emulsion polymer, paint or coating by at least 1° C. The MFFT is measured using ASTM test method D2354. A non-VOC coalescing agent is a coalescing agent which has a boiling point above 280° C. at atmospheric pressure. Examples of coalescing agents that are not VOCs include plasticizers, low molecular weight polymers, surfactants, and autooxidizable plasticizers such as alkyl esters of unsaturated fatty acids. Preferred are alkyl esters prepared from oils such as linseed, tung, dehydrated castor, soybean, tall, sunflower, and corn. Suitable esters of unsaturated fatty acids includes alkyl esters such as, such as methyl and ethyl esters; substituted alkyl esters, such as esters formed from ethylene glycol and propylene glycol; and alkyl ether esters of unsaturated fatty acids, diethylene glycol, triethylene glycol, dipropylene glycol, tripropylene glycol, and diethylene glycol monobutyl ether.

Conventional coatings application methods such as, for example, brushing, rolling, and spraying methods such as, for example, air-atomized spray, air-assisted spray, airless spray, high volume low pressure spray, and air-assisted airless spray may be used to apply the aqueous composition of this invention. Additionally, for some systems, other application techniques may be used to apply the aqueous polymer composition, such as, caulk gun, roll coaters, and curtain coaters. The aqueous polymer composition may be advantageously applied to substrates such as, for example, plastic, wood, metal, primed surfaces, previously painted surfaces, weathered painted surfaces, glass, composites, and cementitious substrates. Drying is typically allowed to proceed under ambient conditions such as, for example, at 0° C. to 35° C. but may be accelerated with heat or low humidity.

Test Methods

Measurement of Hiding:

Using a 1.5 mil Bird applicator, cast thin films of the test paint on Leneta RC-BC black release charts. Using a 25 mil draw down bar, cast one thick film per paint, width-wise, on a Leneta black vinyl scrub chart. Dried overnight at 77+/−3.5° F. and 50+/−5% relative humidity. A Kodak® projector glass slide cover (3.25"×4") was placed on the thin film and scored with an Excel® knife to obtain the test area (13 in$^2$). Five reflectance values were measured using a portable Byk-Gardner 45° reflectometer, on the scored thin film test area and the average value recorded. The first measurement was made at the top left hand corner of the test area. The succeeding measurements were made diagonally down to the lower right hand corner. Five reflectance values were measured on the thick film test area and the average value recorded. Using the tip of an Exacto™ knife, the scored thin film test area was lifted and the film put into a tared pan on a analytical balance. The weight of the film was recorded. From the measured reflectance values of thick and thin film and the weight of film test area, hiding "S" values were calculated. In this test, Kubelka/Munk hiding value "S" is given by:

$$S = X^{-1} R (\ln 1 - R_B R)/(1-R^2)(1-R_B/R)$$

where X is the average film thickness (mils), R is the average reflectance of the thick film and $R_B$ is the average reflectance over black of the thin film on the black Leneta. X was calculated from the weight of the dry paint film ($W_{pf}$), the density (D) of the dry film; and the film area (A). Generally, higher S values are always desirable, since more efficient use of pigment can translate to a better quality coating or lower costs (or both) for the coating manufacturer.

Gloss and Grit Assessment Procedure:

A drawdown of the test sample on a Leneta 5C chart was prepared with a 3 mil Bird film applicator. The chart was dried at 77+/−3.5° F. and 50+/−5% relative humidity for 7 days. The specular gloss was measured at two angles of reflection: 20° and 60°, using a calibrated and standardized Glossgard II Glossmeter, available from the Gardner Company.

The level of grit seen on the dried drawdown was evaluated. The level of grit was reported using the following range: none/very slight/slight/moderate/heavy/severe.

Scrub Resistance Test

This test (based on ASTM D 2486-00) was performed as follows:

A. Preparation of Apparatus:

Abrasion Tester—An abrasion testing device was used which consists of a brush clamped into a bracket which is moved back and forth over the dried, applied paint film by means of a set of cables on either side. The abrasion tester was leveled before use and operated at 37±1 cycles/minute.

Brush—The bristles, if new, were leveled before use to permit uniform wear on the paint surface. Leveling was accomplished by running the brush over 100 or 120 mesh Aluminum Oxide close grain sandpaper.

B. Test:

The coating was drawn down on a black vinyl chart (Type P-121-10N, The Leneta Company) using the 7 mil opening of a 7/10 Dow film caster, starting from the secured end of the panel. The time for application was 3 to 4 seconds from end to end. The coating was air dried in a horizontal position for 7 days in an open room kept at 73.5+/−3.5° F. and 50+/−5% relative humidity. Three drawdowns of each sample were made. Two were tested and averaged if they were within 25% repeatability. If they were not, third was tested and the three averaged. The drawdown was secured to the abrasion tester by using a gasketed frame and brass weights or clamps. The brush was mounted in the holder. 10 g of a scrub medium (Abrasive Scrub Medium, Type SC-2, The Leneta Company) was spread evenly on the brush bristles. The brush was placed at the center of the path. The brush was bristle side up when applying the scrub medium and water, then carefully turned bristle-side down when starting the test. After each 400 cycles before failure, the brush was removed but not rinsed; 10 g of stirred scrub medium added; and the brush replaced. 5 ml of water was placed on the brush before continuing. The number of cycles to remove the paint film fully in one continuous line was recorded.

The following examples serve to illustrate the invention.

| Abbreviations used | |
| --- | --- |
| Butyl acrylate | BA |
| Methyl methacrylate | MMA |
| Methacrylic acid | MAA |
| Ureido methacrylate (50% active) | UMA |
| Phosphoethyl methacrylate (65% active) | PEM |
| Sodium styrene sulfonate (mixture of isomers) | SSS |
| Allyl methacrylate | ALMA |
| Sodium persulfate | NaPS |
| Deionized water | DI water |
| Based on total monomer | botm |

COMPARATIVE EXAMPLE A

PEM (2.3 wt %) Fed Over 100% of Feed

A stage 1 monomer emulsion was prepared by mixing 525 g DI water, 64.8 g (30% active) anionic surfactant A, 974.4 g BA, 703.9 g MMA, 13.89 g MAA, 39.10 g PEM, and 17.4 g UMA. A 5-liter reactor, four-necked round bottom flask equipped with a paddle stirrer, a thermocouple, nitrogen inlet, and reflux condenser was assembled. To the flask was added 926.0 g DI water and 4.63 g (30% active) of an anionic surfactant and stirring was initiated. The contents of the flask were heated to 88° C. under a nitrogen atmosphere. A 110.1 g portion of the stage 1 monomer emulsion was added to the kettle followed by a 25 g DI water rinse. The contents were stirred for 1 minute then a solution of 3.55 g NaPS in 44 g DI water was added. After another 2 minutes monomer emulsion 1 and a solution of 1.58 g NaPS in 118 g DI water were fed separately to the flask over 110 minutes. The contents of the flask were maintained at 84-86° C. during the addition. The monomer emulsion was rinsed with 50 g DI water rinse. The batch was then cooled to 65° C. and partially neutralized with a solution of 15 g (28% conc.) aqueous ammonia in 22 g DI water and a redox pair was added. The batch was cooled to room temperature. While cooling and at <50° C., 196 g of a (6.5%) aqueous solution of potassium hydroxide was added. The measured particle size was 101 nm and solids were 46.3% with a pH of 7.9

Example 1

Preparation of Multistage Emulsion Polymer. PEM (2.3 wt %) Fed Over 70% of Feed A stage 1 monomer emulsion was prepared by mixing 367.5 g DI water, 45.4 g (30% active) anionic surfactant A, 682.1 g BA, 482.9 g MMA, 13.89 g MAA, and 39.10 g PEM. A stage 2 monomer emulsion was prepared by mixing 157.5 g DI water, 19.4 g (30% active) anionic surfactant A, 292.3 g BA, 221.0 g MMA, and 17.4 g UMA. A 5-liter reactor, four-necked round bottom flask equipped with a paddle stirrer, a thermocouple, nitrogen inlet, and reflux condenser was assembled. To the flask was added 926.0 g DI water and 4.63 g (30% active) of an anionic surfactant and stirring was initiated. The contents of the flask were heated to 88° C. under a nitrogen atmosphere. A 110.1 g portion of the stage 1 monomer emulsion was added to the kettle followed by a 25 g DI water rinse.
The contents were stirred for 1 minute then a solution of 3.55 g NaPS in 44 g DI water was added. After another 2 minutes monomer emulsion 1 was added to the flask over 70 minutes. Concurrently, a solution of 1.58 g NaPS in 118 g DI water was fed separately to the flask at a rate of 1.09 g/min. After completion of monomer emulsion 1 feed the initiator cofeed was stopped and batch was held at temperature for 30 minutes. The initiator cofeed was then restarted and monomer emulsion 2 was added over 40 minutes. The contents of the flask were maintained at 84-86° C. during the additions. The monomer emulsion was rinsed with 50 g DI rinse. The batch was then cooled to 65° C. and partially neutralized with a solution of 15 g (28% conc.) aqueous ammonia in 22 g DI water then a redox pair was added. The batch was cooled to room temperature. While cooling and at <50° C., 196 g of a (6.5%) aqueous solution of potassium hydroxide was added. The measured particle size was 100 nm and solids were 46.1% with a pH of 7.8

Example 2

Preparation of Multistage Emulsion Polymer. PEM (2.3%) Fed Over 50% of Feed A stage 1 monomer emulsion was prepared by mixing 225 g DI water, 32.4 g (30% active) anionic surfactant A, 487.2 g BA, 329.7 g MMA, 13.92 g MAA, 39.15 g PEM. A stage 2 monomer emulsion was prepared by mixing 300.0 g DI water, 32.4 g (30% active) anionic surfactant, 487.2 g BA, 374.1 g MMA, and 17.4 g UMA. A 5-liter reactor, four-necked round bottom flask equipped with a paddle stirrer, a thermocouple, nitrogen inlet, and reflux condenser was assembled. To the flask was added 926.0 g DI water and 4.63 g (30% active) of an anionic surfactant and stirring was initiated. The contents of the flask were heated to 88° C. under a nitrogen atmosphere. A 110.1 g portion of the stage 1 monomer emulsion was added to the kettle followed by a 25 g DI water rinse. The contents were stirred for 1 minute then a solution of 3.55 g NaPS in 44 g DI water was added. After another 2 minutes monomer emulsion 1 was added to the flask over 55 minutes. Concurrently, a solution of 1.58 g NaPS in 118 g DI water was fed separately to the flask at a rate of 1.09 g/min. After completion of monomer emulsion 1 feed the initiator cofeed was stopped and batch was held at temperature for 30 minutes. The initiator cofeed was then restarted and monomer emulsion 2 was added over 55 minutes. The contents of the flask were maintained at 84-86° C. during the additions. The monomer emulsion was rinsed with 50 g DI rinse. The batch was then cooled to 65° C. and partially neutralized with a solution of 15 g (28% conc.) aqueous ammonia in 22 g DI water then a redox pair was added. The batch was cooled to room temperature. While cooling and at <50° C., 196 g of a (6.5%) aqueous solution of potassium hydroxide was added. The measured particle size was found to be 107 nm and solids were 46.2% with a pH of 8.0

Example 3

Preparation of Multistage Emulsion Polymer. PEM (2.3%) Fed Over 30% of Feed A stage 1 monomer emulsion was prepared by mixing 200 g DI water, 24.3 g (30% active) anionic surfactant A, 292.0 g BA, 186.2 g MMA 4.17 g MAA, and 39.11 g PEM. A stage 2 monomer emulsion was prepared by mixing 409.6 g DI water, 40.5 g (30% active) anionic surfactant A, 681.3 g BA, 516.9 g MMA, 17.4 g UMA, and 9.7 g MAA. A 5-liter reactor, four-necked round bottom flask equipped with a paddle stirrer, a thermocouple, nitrogen inlet, and reflux condenser was assembled. To the flask was added 926.0 g DI water and 4.63 g (30% active) of an anionic surfactant and stirring was initiated. The contents of the flask were heated to 88° C. under a nitrogen atmosphere. A 110.1 g portion of the stage 1 monomer emulsion was added to the kettle followed by a 25 g DI water rinse. The contents were stirred for 1 minute then a solution of 3.55 g NaPS in 44 g DI water was added. After another 2 minutes monomer emulsion 1 was added to the flask over 40 minutes. Concurrently, a solution of 1.58 g NaPS in 118 g DI water was fed separately to the flask at a rate of 1.09 g/min. After completion of monomer emulsion 1 feed, monomer emulsion 2 was added over 70 minutes. The contents of the flask were maintained at 84-86° C. during the additions. The monomer emulsion was rinsed with 50 g DI rinse. The batch was then cooled to 65° C. and partially neutralized with a solution of 15 g (28% conc.) aqueous ammonia in 22 g DI water then a redox pair was added. The batch was cooled to room temperature. While cooling and at <50° C., 196 g of a (6.5%) aqueous solution of potassium hydroxide was added. The measured particle size was 98 nm and solids were 45.1% with a pH of 7.9.

Example 4

Formation of Aqueous Coating Composition and Evaluation of Opacity

Table 4.1 shows the coating compositions for evaluating the impact of varying size of adsorbing monomer stage. The composites were prepared in one vessel in the order listed on a laboratory mixer under good mixing conditions for the TiO2 addition. The extender grind was prepared as a single large grind which was used for all four paints. Once the composite and extender grind were prepared the paint was mixed in a third vessel in the order listed for the letdown. TAMOL™ 2002 had been neutralized with KOH. S/Mil was evaluated following ASTM Test Method D-2805.70

TABLE 4.1

Aqueous coating composition and evaluation of coating

| Ingredients (in lbs) | Total Solids | Coating Example 5 | Coating Example 6 | Coating Example 7 | Coating Comp. Example B |
|---|---|---|---|---|---|
| Composite Premix | | | | | |
| Example 3 | 45.1% | 269.01 | | | |
| Example 2 | 46.2% | | 264.16 | | |
| Example 1 | 46.1% | | | 265.85 | |
| Comp. Example A | 46.3% | | | | 263.95 |
| TAMOL ™ 2002 KOH | 14.7% | 5.87 | 5.87 | 5.87 | 5.87 |
| FOAMSTAR ™ A-34 | 97.7% | 0.51 | 0.51 | 0.51 | 0.51 |
| Water | 0.0% | 21.47 | 27.65 | 26.24 | 27.93 |
| TI-PURE ™ R-746 | 76.5% | 277.76 | 277.61 | 277.79 | 277.69 |
| Composite Sub-Total | | 574.62 | 575.80 | 576.25 | 575.94 |
| Letdown | | | | | |
| RHOPLEX ™ VSR-1050 | 50.0% | 248.88 | 248.75 | 248.91 | 248.81 |
| ROPAQUE ™ Ultra | 30.0% | 23.47 | 23.45 | 23.47 | 23.46 |
| Propylene Glycol | 0.0% | 9.30 | 9.30 | 9.30 | 9.30 |
| TEXANOL ™ | 0.0% | 4.65 | 4.65 | 4.65 | 4.65 |
| BYK 348 | 50.0% | 2.07 | 2.07 | 2.07 | 2.07 |
| FOAMSTAR ™ A-34 | 97.7% | 1.03 | 1.03 | 1.03 | 1.03 |
| Ammonia (28%) | 0.0% | 0.00 | 0.00 | 0.00 | 0.00 |
| ACRYSOL ™ RM-2020 NPR | 20.0% | 25.93 | 25.92 | 25.94 | 25.93 |
| ACRYSOL ™ RM-8W | 21.5% | 2.80 | 2.80 | 2.80 | 2.80 |
| Water | 0.0% | 128.74 | 128.67 | 128.75 | 128.71 |
| Total | | 1021.49 | 1022.43 | 1023.17 | 1022.69 |

| Coating Properties | Example 5 | Example 6 | Example 7 | Comp. Example B |
|---|---|---|---|---|
| 20° Gloss | 42 | 48 | 45 | 44 |
| 60° Gloss | 76 | 77 | 76 | 76 |
| S/Mil | 6.39 | 6.31 | 6.23 | 5.95 |

TAMOL™ 2002, RHOPLEX™ VSR-1050, ROPAQUE™ Ultra, ACRYSOL™ RM-2020 NPR. and ACRYSOL RM-8W are products of Dow Chemical Co.; TEXANOL™ is a product of Eastman Chemical Co.; FOAMSTAR™ A-34 is a product of Cognis GMBH; TI-PURE ™ R-746 is a product of E.I. DuPont de Nemours and Co.; BYK 348 is a product of Byk-Chemie GMBH.

Aqueous coating compositions of the present invention, Examples 5-7, provide coatings having hiding superior to that of Comp. Example B. Placement of the P-acid monomer (PEM) in a pulse in the formation of the multistage emulsion polymer used in the TiO2/polymer composite is preferred relative to a uniform composition.

Examples 8-10 and Comparative Example C

Preparation of Multistage Emulsion Polymers According to the Teachings of Example 1-3

Example 8: 2.2% PEM (botm) added at first 5-35% (front) of feed

Example 9. 2.2% PEM (botm) added in 35-65% (middle) of feed.

Example 10. 2.2% PEM (botm) added in 65-100% (end) of feed.

Comparative Example C. 2.2% PEM (botm) added in 70-100% (end) of feed with UMA in second stage.

Example 11

Formation of Aqueous Coating Composition and Evaluation of Coating Opacity

Table 11.1 shows the aqueous coating composition for evaluating the impact of adsorbing monomer stage placement. The composites were prepared in one vessel in the order listed on a laboratory mixer under good mixing conditions for the TiO2 addition. The extender grind was prepared as a single large grind which was used for all four paints. Once the composite and extender grind were prepared the paint was mixed in a third vessel in the order listed for the letdown. The TAMOL™ 2002 had been neutralized with KOH. S/Mil was evaluated following ASTM Test Method D-2805.70

TABLE 11.1

| Ingredients (in lbs) | Total Solids | Coating Example 12 | Coating Example 13 | Coating Example 14 | Coating Comp. Ex. D |
|---|---|---|---|---|---|
| Composite Premix | | | | | |
| Example 8 | 46.5% | 253.86 | | | |
| Example 9 | 46.6% | | 253.70 | | |
| Example 10 | 46.0% | | | 256.38 | |
| Comp. Ex. C | 46.1% | | | | 255.83 |
| TAMOL ™ 2002 (25% with KOH) | 25.0% | 3.83 | 3.83 | 3.83 | 3.83 |
| FOAMSTAR ™ A-34 | 97.7% | 1.16 | 1.16 | 1.16 | 1.16 |
| Water | 0.0% | 78.62 | 78.95 | 75.98 | 76.59 |
| TIPURE ™ R-746 | 76.5% | 250.01 | 250.01 | 250.01 | 250.01 |
| Composite Sub-Total | | 587.47 | 587.65 | 587.36 | 587.41 |
| Extender Grind | | | | | |
| Water | 0.0% | 8.92 | 8.92 | 8.92 | 8.92 |
| TAMOL ™ 2002 (25% with KOH) | 25.0% | 0.90 | 0.90 | 0.90 | 0.90 |
| FOAMSTAR ™ A-34 | 97.7% | 1.50 | 1.50 | 1.50 | 1.50 |
| TERGITOL ™ TMN-100X | 90.0% | 3.32 | 3.32 | 3.32 | 3.32 |
| MINEX ™ 10 | 100.0% | 15.00 | 15.00 | 15.00 | 15.00 |
| Extender Grind Sub-Total | | 29.64 | 29.64 | 29.64 | 29.64 |
| In letdown vessel mix the following: | | | | | |
| RHOPLEX ™ VSR-1050LOE | 50.0% | 241.61 | 241.61 | 241.61 | 241.61 |
| Composite Premix | | 587.47 | 587.65 | 587.36 | 587.41 |
| Extender Grind | | 29.64 | 29.64 | 29.64 | 29.64 |
| ROPAQUE ™ Ultra E | 30.0% | 35.20 | 35.20 | 35.20 | 35.20 |
| OPTIFILM ™ Enhancer 400 | 98.0% | 7.46 | 7.46 | 7.46 | 7.46 |
| FOAMSTAR ™ A-34 | 97.7% | 1.00 | 1.00 | 1.00 | 1.00 |
| Water | 0.0% | 70.98 | 70.98 | 70.98 | 70.98 |
| ACRYSOL ™ RM-5000 | 18.5% | 16.00 | 16.00 | 16.00 | 16.00 |
| ACRYSOL ™ RM-8W | 21.5% | 6.00 | 6.00 | 6.00 | 6.00 |
| Water | 0.0% | 20.00 | 20.00 | 20.00 | 20.00 |
| Total | | 1015.36 | 1015.54 | 1015.25 | 1015.30 |
| Properties | | Example 12 | Example 13 | Example 14 | Comp. Ex. D |
| S/Mil | | 6.37 | 6.14 | 6.12 | 5.98 |
| 20° Gloss | | 33.4 | 35.9 | 36.8 | 34.6 |
| 60° Gloss | | 66.3 | 68.4 | 69.2 | 67.8 |

Aqueous coating compositions of the present invention, Examples 12-14, provide coatings having hiding superior to that of Comp. Example D. Placement of the P-acid monomer (PEM) pulse earlier in the multistage emulsion polymer process for formation of TiO2/polymer composites is preferred.

Example 15

Formation of Multistage Emulsion Polymer: (1.5 PEM/0.0 MAA)

A multistage polymer was prepared according to the teachings of Examples 1-3 with the following compositional exceptions: A first monomer emulsion was prepared by mixing 200 g DI water, 27.25 g (30% active) anionic surfactant A, 285.6 g BA, 198.9 g MMA, and 25.5 g PEM. A second monomer emulsion was prepared by mixing 420 g DI water, 27.75 g (30% active) anionic surfactant A, 666.4 g BA, 515.15 g MMA, and 17 g UMA. The measured particle size was 109 nm and the solids were 45.8%.

Example 16

Formation of Multistage Emulsion Polymer (1.2 PEM/0.0 MAA)

A multistage polymer was prepared according to the method of Example 15 with the following exceptions: A first monomer emulsion was prepared by mixing 200 g DI water, 27.25 g (30% active) anionic surfactant A, 285.6 g BA, 204 g MMA, and 20.4 g PEM. A second monomer emulsion was prepared by mixing 420 g DI water, 27.75 g (30% active) anionic surfactant A, 666.4 g BA, 515.15 g MMA, and 17 g UMA. The measured particle size was 109 nm and the solids were 45.9%.

Example 17

Formation of Multistage Emulsion Polymer (1.2 PEM/0.5 MAA)

A multistage polymer was prepared according to the method of Example 15 with the following exceptions: A first monomer emulsion was prepared by mixing 200 g DI water, 27.25 g (30% active) anionic surfactant A, 285.6 g BA, 190.38 g MMA, 25.5 g PEM, and 8.52 g MAA. A second monomer emulsion was prepared by mixing 420 g DI water, 27.75 g (30% active) anionic surfactant A, 666.4 g BA, 515.15 g MMA, and 17 g UMA. The measured particle size was 98 nm and the solids were 45.7%.

Example 18

Formation of Multistage Emulsion Polymer (1.2 PEM/0.4 MAA)

A multistage polymer was prepared according to the method of Example 15 with the following exceptions: A first monomer emulsion was prepared by mixing 200 g DI water, 27.25 g (30% active) anionic surfactant A, 285.6 g BA, 197.22 g MMA, 20.4 g PEM, and 6.78 g MAA. A second monomer emulsion was prepared by mixing 420 g DI water, 27.75 g (30% active) anionic surfactant A, 666.4 g BA, 515.15 g MMA, and 17 g UMA. The measured particle size was 96 nm and the solids were 45.9%.

Example 19

Evaluation of the Effect of Co-Acid in Multistage Emulsion Polymers on Scrub Resistance of Coatings Aqueous coating compositions were prepared including composites formed from multistage emulsion polymers, Examples 15-18 and coatings prepared from them were evaluated for scrub resistance. Results are presented in Table 19.2. The composites were prepared in one vessel, in the order listed, on a laboratory mixer under good mixing conditions for the TiO2 addition. The extender grind was prepared in a separate vessel. Once the composite and extender grind were prepared, the aqueous coating was mixed in a third vessel in the order listed for the formulation. The Abrasive Scrub Resistance test (based on ASTM D 2486-00) was performed collecting 8 data points on each coating.

TABLE 19.1

Preparation of composites and aqueous coating compositions

| Ingredients (in lbs) | | | | |
|---|---|---|---|---|
| Composite Premix | | | | |
| Polymer Example 15 | 246.4 | | | |
| Polymer Example 16 | | 244.3 | | |
| Polymer Example 17 | | | 249.5 | |
| Polymer Example 18 | | | | 242.3 |
| FOAMSTAR ™ A-34 | 0.5 | 0.5 | 0.5 | 0.5 |
| Water | 49.1 | 50.8 | 46.0 | 53.2 |
| TiO2 Slurry | 251.0 | 251.0 | 251.0 | 251.0 |
| Composite Sub-Total | 547.0 | 546.5 | 547.0 | 547.0 |
| Grind | | | | |
| TAMOL ™ 2002 neutralized | 2.3 | 2.3 | 2.3 | 2.3 |
| Wetting Aid Surfactant | 2.5 | 2.5 | 2.5 | 2.5 |
| Grind Defoamer | 1.0 | 1.0 | 1.0 | 1.0 |
| Water | 20.0 | 20.0 | 20.0 | 20.0 |
| Extenders | 28.0 | 28.0 | 28.0 | 28.0 |
| ACRYSOL ™ RM-5000 | 10.0 | 10.0 | 10.0 | 10.0 |
| Grind Sub-Total | 63.8 | 63.8 | 63.8 | 63.8 |
| RHOPLEX ™ Emulsion | 219.7 | 219.7 | 219.7 | 217.0 |
| Plasticizer | 3.4 | 3.3 | 3.4 | 3.3 |
| Potassium Hydroxide (5%) | 2.6 | 1.0 | 1.3 | 2.4 |
| ROPAQUE ™ Ultra | 65.0 | 65.0 | 65.0 | 65.0 |
| Letdown Defoamer | 1.0 | 1.0 | 1.0 | 1.0 |
| ACRYSOL ™ RM-5000 | 16.6 | 13.0 | 16.1 | 18.3 |
| ACRYSOL ™ RM-8W | 4.2 | 4.4 | 2.5 | 4.3 |
| Water | 94.8 | 101.4 | 98.5 | 98.5 |
| Total | 1018.1 | 1019.2 | 1018.3 | 1020.7 |

TABLE 19.2

Effect of co-acid on aqueous coating properties and scrub resistance of coatings.

| Example | PEM/MAA(botm) | Scrub Resistance | Aqueous Coating Stability |
|---|---|---|---|
| Example 15 | 1.5/0.0 | NA | Coating Solidified |
| Example 16 | 1.2/0.0 | NA | Coating Solidified |
| Example 17 | 1.5/0.5 | 824 | Composite settled |
| Example 18 | 1.2/0.4 | 926 | Excellent |

The use of coacid in multistage emulsion polymers of the invention favors polymer makeability and aqueous coating stability (higher PEM requires higher co-acid levels). A lower coacid level favors scrub resistance of the coating including multistage emulsion polymer/TiO2 composites.

Example 29

Evaluation of the Effect of Co-Acid in Multistage Emulsion Polymers on Hiding and Scrub Resistance of Coatings Prepared Therefrom Aqueous coating compositions were prepared including composites formed from multistage emulsion polymers and coatings evaluated for hiding and scrub resistance.

TABLE 29.1

Effect of co-acid on Scrub resistance of multistage polymers.

| Emulsion Polymer Example | % MAA | PS (nm) | % PEM | 20° Gloss | 60° Gloss | Hiding S/mil | # Scrub Resistance |
|---|---|---|---|---|---|---|---|
| 20 | 0.4 | 103 | 2 | 10.1 | 41.6 | 6.44 | 653 |
| 21 | 0.8 | 111 | 2 | 9.2 | 40.2 | 6.63 | 499 |
| 22 | 0.4 | 82 | 2 | 8.4 | 39.1 | 6.43 | 755 |
| 23 | 0.8 | 68 | 2 | 6.6 | 35.4 | 6.05 | 468 |
| 24 | 0.4 | 70 | 2.3 | 7.8 | 37.3 | 6.64 | 712 |
| 25 | 0.8 | 68 | 2.3 | 8.3 | 38.6 | 6.21 | 542 |
| 26 | 0.4IA | 113 | 2.3* | 9.8 | 41.7 | 6.50 | 783 |
| 27 | 0.4 HEMA | 115 | 2.3* | 8.4 | 39.4 | 6.01 | 977 |
| 28 | 0 | 112 | 2.3* | 10.3 | 42.0 | 6.80 | 1035 |

% PEM is based on total monomer. All of the PEM is charged into Stage 1 (excluded from ME seed)
*All the PEM is charged in Stage 1 (PEM is included in the ME Seed)
% MAA is based on total monomer and uniformly added throughout process.

The first 3 pairs of samples were made in the same coating series.

The last set of 3 samples were evaluated in a different coating series.

The use of coacid in multistage emulsion polymers of the invention favors lower MAA co-acid over higher MAA based on scrub resistance of coatings incorporating TiO2/multistage emulsion polymer composites incorporating the emulsion polymers.

Example 38

Evaluation of the Effect of Co-Acid and UMA in Multistage Emulsion Polymers on Hiding of Coatings Prepared therefrom Aqueous coating compositions were prepared including composites formed from TiO2 and multistage emulsion polymers and coatings were evaluated for hiding and gloss.

TABLE 38.1

Effect of co-acid on hiding of multistage polymers.
Each pair was formulated in the same series and formulation but not the entire data set.

| Emulsion Polymer Example | Composition | % PEM (botm) | % PEM in Pulsed Stage | % UMA (botm) | % UMA pulsed in PEM stage | 20° Gloss | 60° Gloss | Hiding S/mil |
|---|---|---|---|---|---|---|---|---|
| 30 | 50 (58 BA/36.8 MMA/3.6 PEM/1.6 MAA) // 50 (58 BA/42 MMA) | 1.8 | 3.6 | 0 | 0 | 42.1 | 73.3 | 6.58 |
| 31 | 50 (58 BA/35.8 MMA/1 UMA/3.6 PEM/1.6 MAA) // 50 (58 BA/42 MMA) | 1.8 | 3.6 | 0.5 | 1.0 | 45.5 | 73.8 | 6.84 |
| 32 | 40 (58 BA/35.5 MMA/4.5 PEM/2 MAA) // 60 (58 BA/41.17 MMA/0.83 UMA) | 1.8 | 4.5 | 0.5 | 0.0 | 45.6 | 73.5 | 6.86 |
| 33 | 40 (58 BA/34.25 MMA/1.25 UMA/4.5 PEM/2 MAA) // 60 (58 BA/42 MMA) | 1.8 | 4.5 | 0.5 | 1.3 | 47.2 | 73.6 | 7.10 |
| 34 | 30 (59.6 BA/34.2 MMA/6.2 PEM) // 70 (58 BA/41.3/0.7 UMA) -- no MAA | 1.86 | 6.2 | 0.5 | 0.0 | 42.6 | 73.3 | 6.68 |
| 35 | 30 (59.6 BA/32.45 MMA/1.75 UMA/6.2 PEM) // 70 (58 BA/42 MMA) -- no MAA | 1.86 | 6.2 | 0.5 | 1.8 | 45 | 73 | 6.99 |
| 36 | 65 (56 BA/43.6 MMA/0.4 MAA) // 35 (56 BA/35.88 MMA/6.29 PEM/UMA/0.4 MAA) | 2.2 | 6.3 Last third | 0.5 | 1.43 | 36.8 | 69.2 | 6.12 |
| 37 | 35 (56 BA/43.6 MMA/0.4 MAA) // 35 (56 BA/42.17 MMA/1.43 UMA/0.4 MAA)// 30 (56 BA/36.27 MMA/PEM/0.4 MAA) | 2.2 | 7.3 | 0.5 | 0 | 34.6 | 67.8 | 5.98 |

The co-staging of PEM and UMA in multistage emulsion polymers of the invention provides better hiding in coatings including composites formed from TiO2 and the emulsion polymers.

Example 43

Effect of SSS as Coacid with PEM

TABLE 43.1

Effect of copolymerized coacid in multistage emulsion polymer
Composites were formed from the multistage emulsion polymers,
Examples 39-42, with TIPURE R-746 (TiO2), then were formulated in a
PVC = 29.19; VS = 34.01 aqueous coating composition, and coatings were evaluated
for scrub and hiding

| Emulsion Polymer Example | Composition | % PEM (botm) wt. % | % PEM in Pulsed Stage | Coacid wt. % | Scrubs | 60° Gloss | S/mil Equil. 1 Day |
|---|---|---|---|---|---|---|---|
| 39 | 30.4 (56 BA/33.97 MMA/8.7 PEM/1.33 MAA) //70 (56 BA/43.29 MMA/0.71 UMA) | 2.6 | 8.7% (Front) | 0.4% MAA | 958 | 36.1 | 6.49 |

TABLE 43.1-continued

Effect of copolymerized coacid in multistage emulsion polymer
Composites were formed from the multistage emulsion polymers,
Examples 39-42, with TIPURE R-746 (TiO2), then were formulated in a
PVC = 29.19; VS = 34.01 aqueous coating composition, and coatings were evaluated
for scrub and hiding

| Emulsion Polymer Example | Composition | % PEM (botm) wt. % | % PEM in Pulsed Stage | Coacid wt. % | Scrubs | 60° Gloss | S/mil Equil. 1 Day |
|---|---|---|---|---|---|---|---|
| 40 | 30 (56 BA/33.97 MMA/ 8.7 PEM/1.33 SSS) //70 (56 BA/43.29 MMA/ 0.71 UMA) | 2.6 | 8.7% (Front) | 0.4% SSS | 1208 | 37.8 | 6.41 |
| 41 | 30 (56 BA/36.0 MMA/ 6.7 PEM/ 1.33 MAA) //70 (56 BA/ 43.29 MMA/0.71 UMA) | 2 | 6.7% (Front) | 0.4% MAA | 822 | 31.4 | 6.38 |
| 42 | 30.4 (56 BA/36.0 MMA/ 6.7 PEM/1.33 SSS) //70 (56 BA/43.29 MMA/0.71 UMA) | 2 | 6.7% (Front) | 0.4% SSS | 1157 | 41.1 | 6.28 |

SSS as coacid with PEM in multistage emulsion polymers of this invention used in TiO2/polymer composites provides coatings having superior scrub resistance and gloss relative to MAA as a coacid with a modest decline in hiding.

Example 47

Effect of Copolymerized Multiethylenically Unsaturated Monomer in P-Acid Monomer Stage Composites including multistage emulsion polymers, Examples 44-46, were prepared in one vessel, in the order listed, on a laboratory mixer under good mixing conditions for the TiO2 addition. The extender grind was prepared as a single large grind which was used for all three aqueous coating compositions. Once the composite and extender grind were prepared the paint was mixed in a third vessel in the order listed for the formulation. Hiding S/Mil was evaluated following ASTM Test Method D-2805.70. The Abrasive Scrub Resistance test (based on ASTM D 2486-00) was performed collecting 8 data points on each coating.

| Ingredients (in lbs) | | | |
|---|---|---|---|
| Composite Premix | | | |
| Emulsion Pol. Example 44 | 263.0 | | |
| Emulsion Pol. Example 45 | | 263.8 | |
| Emulsion Pol. Example 45 | | | 259.5 |
| FOAMSTAR ™ A-34 | 0.5 | 0.5 | 0.5 |
| Water | 50.9 | 50.0 | 54.4 |
| KRONOS ® 4311 | 252.8 | 252.8 | 252.8 |
| Composite Sub-Total | 567.1 | 567.1 | 567.1 |
| Extender Grind | | | |
| Water | 50.0 | 50.0 | 50.0 |
| TAMOL ™ 165A | 1.2 | 1.2 | 1.2 |
| BYK ®-021 | 1.5 | 1.5 | 1.5 |
| TERGITOL ™ TMN 10 | 3.3 | 3.3 | 3.3 |
| MINEX ® 10 | 15.0 | 15.0 | 15.0 |
| ACRYSOl ™ RM-5000 | 5.0 | 5.0 | 5.0 |
| Extender Grind Sub-Total | 76.1 | 76.1 | 76.1 |
| In the letdown vessel mix the following: | | | |
| RHOPLEX ™ VSR-1050LOE | 218.7 | 216.1 | 218.7 |
| OPTIFILM ™ Enhancer 400 | 4.8 | 4.8 | 4.8 |
| Composite Premix | | | |
| Extender Grind | | | |
| ROPAQUE ™ Ultra | 35.0 | 35.0 | 35.0 |
| BYK ®-021 | 1.0 | 1.0 | 1.0 |
| Potassium Hydroxide (5%) | 0.0 | 1.9 | 0.0 |
| ACRYSOL ™ RM-5000 | 23.6 | 23.8 | 23.6 |
| Water | 81.2 | 84.8 | 84.4 |
| ACRYSOL ™ RM-8W | 3.4 | 3.6 | 3.4 |

TABLE 47.1

Effect of copolymerized multiethylenically unsaturated monomer

| Emulsion Polymer Example | Composition | PEM/ Co-Acid wt. % | ALMA, Stage I wt. % | ALMA BOTM wt. % | Scrubs Average of 8 | Hiding |
|---|---|---|---|---|---|---|
| 44 | 30 (56 BA/38.67 MMA/ 1.33 SSS/4 PEM//70 (56 BA/43.29 MMA/0.71 UMA) | 1.2/ 0.4SSS | 0.00 | 0.00 | 1584 | 6.41 |
| 45 | 30 (56 BA/38.7 MMA/ 1.3 SSS/4 PEM/0.5ALMA)// 70 (56 BA/43.3 MMA/ 0.7 UMA) | 1.2/ 0.4SSS | 0.50 | 0.15 | 1166 | 6.47 |

TABLE 47.1-continued

Effect of copolymerized multiethylenically unsaturated monomer

| Emulsion Polymer Example | Composition | PEM/ Co-Acid wt. % | ALMA, Stage I wt. % | ALMA BOTM wt. % | Scrubs Average of 8 | Hiding |
|---|---|---|---|---|---|---|
| 46 | 30 (56 BA/38.7 MMA/ 1.3 SSS/4 PEM/1ALMA)// 70 (56 BA/43.3 MMA/ 0.7 UMA) | 1.2/ 0.4SSS | 1.00 | 0.30 | 1121 | 6.47 |

ALMA at 0.5%-1%, by wt., in the same stage as PEM in multistage emulsion polymers of this invention provides coatings including TiO2/polymer composites that demonstrate deterioration in scrub resistance at approximately constant hiding.

What is claimed is:

1. A multistage emulsion polymer comprising, as copolymerized units:
   from 1.0% to 4% by weight P-acid monomer, based on the weight of said emulsion polymer;
   from 0% to 0.05% by weight multiethylenically unsaturated monomer, based on the weight of said emulsion polymer; and
   at least one second monoethylenically unsaturated monomer excluding acid group containing monomers and aldehyde-reactive group-containing monomers;
   said multistage emulsion polymer having a calculated Tg of from −10° C. to 20° C.;
   wherein said multistage emulsion polymer is formed by emulsion copolymerization of said at least one monoethylenically unsaturated monomer wherein 75% to 100%, by weight, of said P-acid monomer and from 0.01% to 0.6%, by weight, based on the weight of said emulsion polymer, second acid containing monomer is added concurrently with said monoethylenically unsaturated monomer during a stage comprising from 10% to 50% of the total monomer weight, said stage beginning at from 0 to 65% of total added monomer weight.

2. The multistage emulsion polymer of claim 1 wherein said second acid containing monomer is selected from the group consisting of methacrylic acid and sodium styrene sulfonate.

3. The multistage emulsion polymer of claim 1 wherein said stage wherein 75% to 100%, by weight, of said P-acid monomer is added concurrently with said monoethylenically unsaturated monomer further comprises the addition of from 0.01 to 3%, by weight, based on the weight of said emulsion polymer, aldehyde-reactive group-containing monomer.

4. A method for forming a multistage emulsion polymer comprising, as copolymerized units:
   from 1.0% to 4%, by weight P-acid monomer, based on the weight of said emulsion polymer;
   from 0% to 0.05% by weight multiethylenically unsaturated monomer, based on the weight of said emulsion polymer; and
   at least one second monoethylenically unsaturated monomer excluding acid group containing monomers and aldehyde-reactive group containing monomers;
   said emulsion polymer having a calculated Tg of from 10° C. to 20° C.;
   comprising:
   (a) emulsion copolymerizing said at least one second monoethylenically unsaturated monomer; and
   (b) adding 75% to 100%, by weight, of said P-acid monomer monomer and from 0.01% to 0.6%, by weight, based on the weight of said emulsion polymer, second acid containing monomer concurrently with said second monoethylenically unsaturated monomer during a stage comprising from 10% to 50% of the total monomer weight, said stage beginning at from 0 to 65% of total added monomer weight.

5. A composite particle comprising: a) a TiO2 particle; and b) a plurality of polymer particles of the multistage emulsion polymer of claim 1 adsorbed on the surface of said TiO2 particle.

6. An aqueous coating composition comprising the composite particle of claim 5.

7. A method for providing a coating comprising
   (a) forming the aqueous coating composition of claim 6;
   (b) applying said aqueous coating composition to a substrate; and
   (c) drying, or allowing to dry, said applied aqueous coating composition.

* * * * *